US012756748B2

(12) United States Patent
Venkatakrishnan et al.

(10) Patent No.: US 12,756,748 B2
(45) Date of Patent: Oct. 6, 2026

(54) DEVICE-TO-DEVICE COMMUNICATION SYSTEM WITH INTERMEDIATED CONNECTION SERVER TO ALLOW FOR USER CONTROL OF COMMUNICATION PATHS

(71) Applicant: Yellcast, Inc., San Carlos, CA (US)

(72) Inventors: Ganesan Venkatakrishnan, San Carlos, CA (US); Thomas William Ellenby, San Jose, CA (US); Peter Ellenby, San Carlos, CA (US); William Foster, Tucson, AZ (US)

(73) Assignee: Yellcast, Inc., San Carlos, CA (US)

( * ) Notice: Subject to any disclaimer, the term of this patent is extended or adjusted under 35 U.S.C. 154(b) by 133 days.

(21) Appl. No.: 18/343,264

(22) Filed: Jun. 28, 2023

(65) Prior Publication Data

US 2024/0015188 A1 Jan. 11, 2024

Related U.S. Application Data

(60) Provisional application No. 63/359,733, filed on Jul. 8, 2022.

(51) Int. Cl.
*H04L 65/1059* (2022.01)
*H04L 65/1069* (2022.01)

(52) U.S. Cl.
CPC ...... *H04L 65/1059* (2013.01); *H04L 65/1069* (2013.01)

(58) Field of Classification Search
CPC ........................ H04L 65/1059; H04L 65/1069
See application file for complete search history.

(56) References Cited

U.S. PATENT DOCUMENTS

| | | | | |
|---|---|---|---|---|
| 9,069,385 | B1 * | 6/2015 | Lynch | G06F 3/014 |
| 2011/0163944 | A1 * | 7/2011 | Bilbrey | G06F 1/1626<br>715/863 |
| 2013/0315108 | A1 * | 11/2013 | Lindner | H04L 65/4046<br>455/518 |
| 2020/0051024 | A1 * | 2/2020 | Oberle | H04L 51/48 |
| 2020/0177689 | A1 * | 6/2020 | Sellers | G06Q 30/0226 |
| 2021/0081157 | A1 * | 3/2021 | Lam | G06F 3/04842 |
| 2021/0097799 | A1 * | 4/2021 | Leu | G06Q 20/223 |
| 2021/0243569 | A1 * | 8/2021 | Baez | H04W 76/11 |
| 2022/0385738 | A1 * | 12/2022 | Circosta | H04L 63/101 |

* cited by examiner

*Primary Examiner* — Kostas J Katsikis
(74) *Attorney, Agent, or Firm* — Haynes and Boone, LLP

(57) ABSTRACT

The system provides an intermediated server that allows creation of communication channels between a first mobile device and a second mobile device based on a first identifier and a second identifier associated with the first mobile device and the second mobile device. The first mobile device or the second mobile device may sever the communication channel via the intermediated server by removing the first identifier or the second identifier from the intermediated server, which prevents the second mobile device or the first mobile device as the case may be from accessing the communication channel.

19 Claims, 10 Drawing Sheets

DEVICE-TO-DEVICE COMMUNICATION SYSTEM WITH INTERMEDIATED CONNECTION SERVER TO ALLOW FOR USER CONTROL OF COMMUNICATION PATHS

CROSS-REFERENCES TO PRIORITY AND RELATED APPLICATIONS

This application is a non-provisional of, and claims the benefit of and priority from, U.S. Provisional Patent Application No. 63/359,733 filed Jul. 8, 2022, entitled "Device-to-Device Communication System with Intermediated Connection Server to Allow for User Control of Communication Paths."

The entire disclosure(s) of application(s)/patent(s) recited above is(are) hereby incorporated by reference, as if set forth in full in this document, for all purposes.

FIELD

The present disclosure generally relates to mobile device communication and more particularly to control of communication paths between mobile devices.

BACKGROUND

A mobile device can be used to provide a user with real-time communication channels. For example, the mobile device may be used to access different communication channels between different users, such as text messages, email communication, voice communication, video communication, communication over social media and the like. Examples of modes of communication may include one-to-one communication between two users on their respective mobile devices and may include one-to-many communications between user devices, some of which may be mobile devices. A one-to-many communication may be between one user of a mobile device and a small or a large group of users on other devices.

The mobile device may also allow interactions between a mobile device associated with the user and other mobile devices associated with other users, business groups, or the interactions could extend to communication with devices associated with places, things, concepts, ideas, purpose and the like in the real world.

Because of the wide spectrum of interactions between the use of the mobile device, there is a need to enable secure, anonymous and, if desired, severable, voice communication, texts, email, etc. and the ability to share content such as photos, videos, songs, movies, links and other documents in these communication channels with absolute security, privacy and personal control.

SUMMARY

The various embodiments described herein aims to provide a secure, anonymous and severable personal communications system with granular control for the entity using the system. A severable communications system enables communication without requiring the sharing of personally identifiable information between communicants. Examples of personally identifiable information might include a user ID, a phone number, a username, an email address, a social media handle, and/or the like. A mobile device associated with a first entity may search in the real world, where meaningful connections happen, and communicate with other mobile devices associated with other entities without disclosing personally identifiable information.

In some embodiments, a first user, using a first device, can connect to a second user, them using a second device, and the first user and the second user can then establish a communication channel. The communication channel might be a voice channel, a chat channel, an e-mail channel, a data channel, or some other channel. The first user can select some user-selected identifiers that the first user can use to remember the second user and/or reference the second user on a user interface of the first device. Unless the second user personally and optionally provides the first user with personally identifiable information, the user-selected identifiers would be from the first user's knowledge. For example, the first user might store a label "British salesperson met at global conference" and an icon of a bird.

The communication channel relies on server control of the communication channel and either participant can convey to the server that the communication channel should be closed, in which case, further communication over that channel is no longer possible. Without personally identifiable information, it would be difficult for one party to continue communicating with the other party after the other party indicates a desire to receive no further communication.

A second mobile device associated with a second entity may receive the name and photo from the first mobile device via the intermediated server. The second mobile device, the second entity or both may use the photo and name to visually confirm the identity of the first entity or the second entity as the case may be before establishing a communication channel between the first mobile device and the second mobile device when the first and the second mobile devices are within proximity. In some embodiments, the intermediated server of the system may receive the entity information from the mobile device based on explicit consent form the entity, via an interface that allows the system to receive a name, add a photo, and the like to facilitate the face-to-face interaction.

The system may determine a first identifier associated with the first mobile device, a second identifier associated with a second mobile device and create a communication channel via the intermediated server based on the first identifier and the second identifier, wherein the first identifier and the second identifier are not linked to the identity of the first user and the second user on the intermediated server. In some embodiments, the system may determine the identifier associated with the mobile device based on the unique mobile device ID ("UMID") of the mobile device, a unique ID generated by an application such as a severable communications system application running on the mobile device, or both.

The system may allow the first mobile device and the second mobile device via the communication channel to establish and utilize various modes of communication such as textual communication, audio communication, video communication and the like without disclosing personally identifiable information including information such as a phone number, email address, social media handle, a username or the like permanently. In some embodiments, when the communication channel is revoked by the first mobile device or the second mobile device, the graphical user interface of the second mobile device no longer displays the communication channel.

The first mobile device or the second mobile device may sever the communication channel via the intermediated server preventing further communication between the first mobile device and the second mobile device in response to a request from an entity associated with the first mobile device, the second mobile device or both. In some embodiments, the system may allow the first mobile device or the second mobile device to partially sever the communication channel, such as sever some modes of communication. For example, the first mobile device may limit the communication mode available between the first mobile device and the second mobile device to exclude access to email communication and allow only the use of a text message functionality via the severable communications system app.

In contrast, some communication applications link the identity of the user to the username, phone number, or unique identifier on a centralized server. The centralized server in prior systems allows the server to track the user or to compromise the communication of the server. Moreover, in prior systems the communication channel between the users is controlled by the centralized server, and the personally identifiable information such as email, username, social media handle, phone number and the like are irrevocably disclosed to the other mobile device and the entity associated with the other user.

In some embodiments, the first mobile device may associate the entity and the user profile of the entity, transfer the user profile for display on the second mobile device via the communication channel. The first mobile device via the severable communications system app may store on the first mobile device, an identity of the entity associated with the mobile device, the connections between the entity and other entities associated with other mobile devices, communication channels associated with the entity and other entities associated with other mobile devices, relationships between the entity and other objects such as business, places, and the like and other profile information associated with the entity. Because the mobile device does not share the profile information with the intermediating server, the system may not be unaware of information associated with the mobile device or the entity associated with the mobile device. In some embodiments, the system may receive a UMID generated by the mobile device and use the UMID as an encryption handle that secures the communication between the mobile device and other mobile devices. In this manner, even two proximate users with their mobile devices can connect regardless of whether both of them are already known to a mediation server.

The first mobile device may allow the first entity to have granular control over the communication channels. For example, the first mobile device may establish a unique identifier (such as a UMID) for the communication channel, the second mobile device, the second entity, the different modes of communication, and the like that may be used to control the communication channel, mode of the communication and the like between the first mobile device and other mobile devices. In some embodiments, the first mobile device may establish aliases such as nicknames that may be specific to a connection, communication channel, the second mobile device associated with the second entity and the like. The first mobile device associated with the first entity may store and manage a separate profile picture, image, or avatar that is specific to the connection, communication channel, the second mobile device associated with the second entity and the like.

In some embodiments, the UMID is supplied by a device operating system and can be used to uniquely identify a connecting device, regardless of whether the connecting device has installed a severable communications system app or module. Thus, two or more devices might communicate via a severable communications system, wherein the anonymizing system provides for two-way communications between devices using a device identifier that can be removed after communications by initiating, via a first user interface of a first device, a two-way communication between the first device and a second device, wherein the two-way communication is initiated by a first user of the first device and directed to a second user of the second device, determining a first identifier, stored by the anonymizing system, associated with the first device, determining a second identifier, stored by the anonymizing system, associated with the second device, and establishing, via the anonymizing system, a communication channel based on the first identifier and the second identifier, wherein at least one of the first device and the second device are identified to the anonymizing system by a device identifier.

In some embodiments, the first mobile device may disconnect the connections to other mobile devices associated with other entity temporarily or permanently without any trace after the disconnection. For example, the first mobile device may revoke access to the UMID that is associated with a communication channel, a mode of communication in a communication channel and the like, on the first mobile device, which severs the communication channel, the mode of communication in the communication channel in accessible from the second mobile device.

In some embodiments, the first mobile device may erase any actions that occurred within the communication channel such as chats, payments, media sharing and the like based on the entity preferences. The first mobile device may create temporary "handles" in random number format or custom text phrases that may be shared over other messaging means in cases where the first mobile device and the second mobile device are not meeting in proximity. Examples of messaging means might include a texting side channel, a wireless communication pathway, a channel over cellular infrastructure, an optical communications channel, an audio channel, or some other structure that can be used for conveying information from one mobile device to another device.

In some embodiments, where information about a first entity associated with the first mobile device is to be moved such as to a different mobile device, the first mobile device may create a unique handle which may be a text string of numbers or alphabets which will be active only for a short period of time during which the information may be migrated from the first mobile device to the different mobile device using that handle for a limited period of time.

In some embodiments, the first mobile device may control the granularity of the communication channels, such as the entities that can communicate with the first mobile device, the communications channels through with the other entities can communicate with the first mobile device. In some embodiments, the granularity of control over the communication channel, the attributes of the information that are shared over the communication channel are controlled by the first mobile device and the first entity associated with the first mobile device. In some embodiments, the severable communications system need not be aware of the granularity or even the entities that communicate with the first mobile device and the entity associated with the first mobile device.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
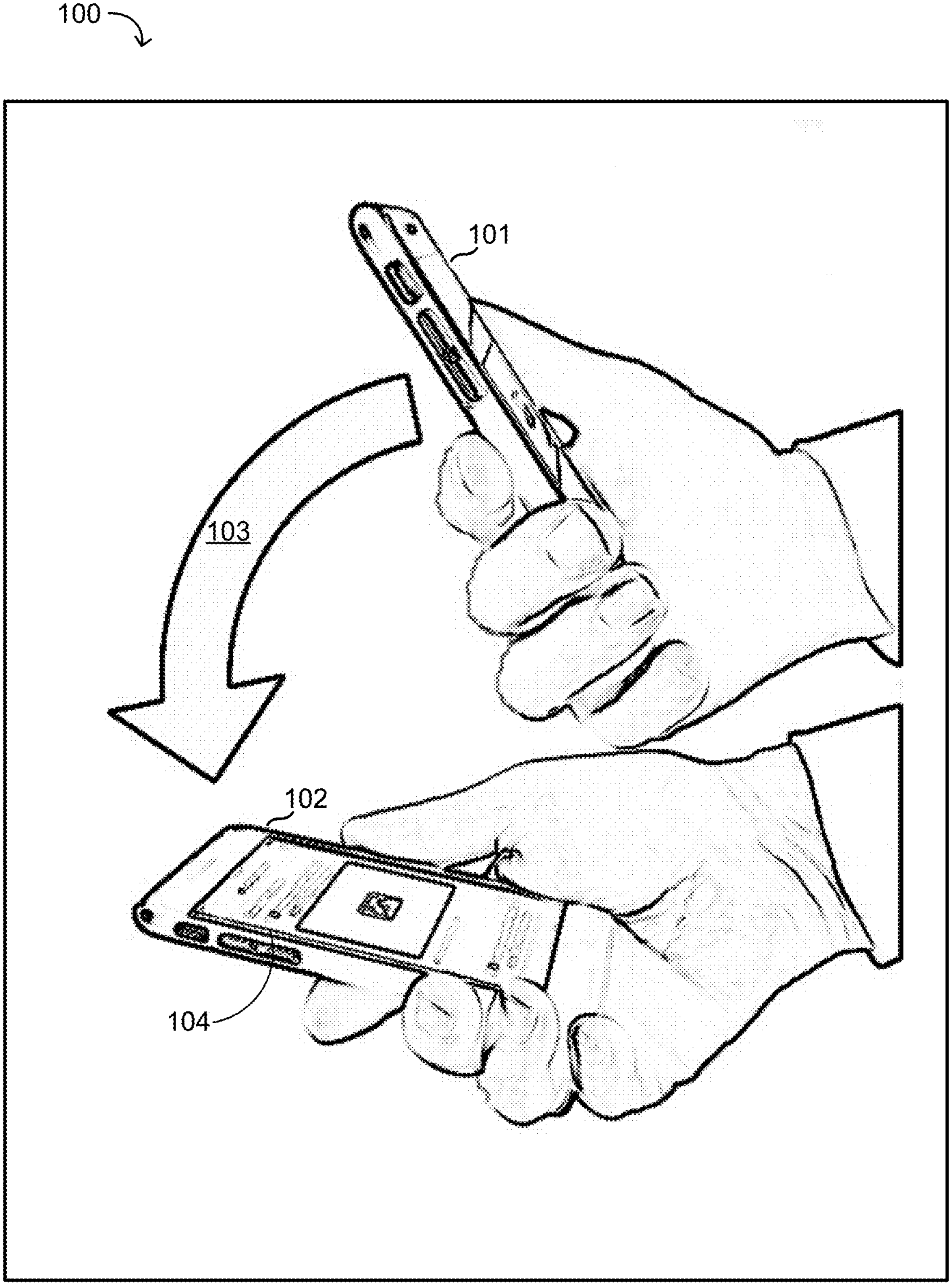
FIG. 1 is an orthogonal drawing illustrating a mobile device performing a geogesture, such as a motion or input provided by a user of the mobile device to specify or select a desired geolocation and/or orientation.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In an example, the system may use smart mobile devices, and other devices, that allow entities associated with the mobile device to perform actions and interactions based on the geographic location and/or a physical gesture of a mobile device, generally a mobile phone or a tablet. A gesture might be deemed to have been made upon detection of particular movements or actions as might be determined by the mobile device's accelerometers, gyroscopes or other internal sensors used to determine a device's spatial state and/or motion, combined with that device's real world position as sensed by the mobile device's positioning/proximity sensors such as GPS, AGPS, NFC, UWB, Bluetooth, or other position sensing technology and the device's compass bearing (pointing direction) as determined by the mobile device's compass or other means of determining one or more pointing directions. For example, by monitoring the compass and accelerometers of the mobile device, or other sensors that record the spatial situation of mobile devices such as smart phones and tablets, the mobile device can initiate a local geographically based action and/or interaction in a specific direction.

A gesture, location of the gesture or both may be represented in a data structure by a single point, a latitude and longitude or other geographic coordinate system, and Polygon and Polyhedron, or other 3D shapes such as spheres or cones. The system may receive input from a mobile device equipped with a GPS module, AGPS, NFC, UWB, Bluetooth, or some other positioning means, and a means of determining the device's orientation such as a digital compass, gyroscope, etc., to sense inputs from a user of the mobile device. The system may combine two or more pointing or casting actions. The system may determine two unique vectors based on the position of the phone and the orientation of the mobile device. The intersection of these vectors, each from a unique position (point A and point B), or shapes associated with these vectors results in a unique gesture. The system may determine the location of the first mobile device based on the second position and the second orientation and based on a determined gesture. In an example, the point B of the gesture where the first mobile device ends up corresponds to an approximate location of the first mobile device or one of the nodes for a polygon. In an example, the axis about which the mobile device rotates to the left or right after a casting gesture may correspond to an approximate location of a first mobile device, one of the nodes, a polyhedron, and/or other representation of a location boundary. The system may determine the location of devices such as the second mobile device that are proximate to the first mobile device based on the location and the gesture of the first mobile device.

In some embodiments, the first mobile device may query a remote database with a point of interest database that includes a list of mobile devices that are proximate to the first mobile device. The first mobile device may further use a gesture such as a casting motion to narrow down the potential matches from the point of interest database. The first mobile device may then select the second mobile device from the list presented on the screen. To initiate communication, the first mobile device may present a code that may be scanned by the second mobile device to confirm creation of a communication channel between the first mobile device and the second mobile device.

Figure 3:
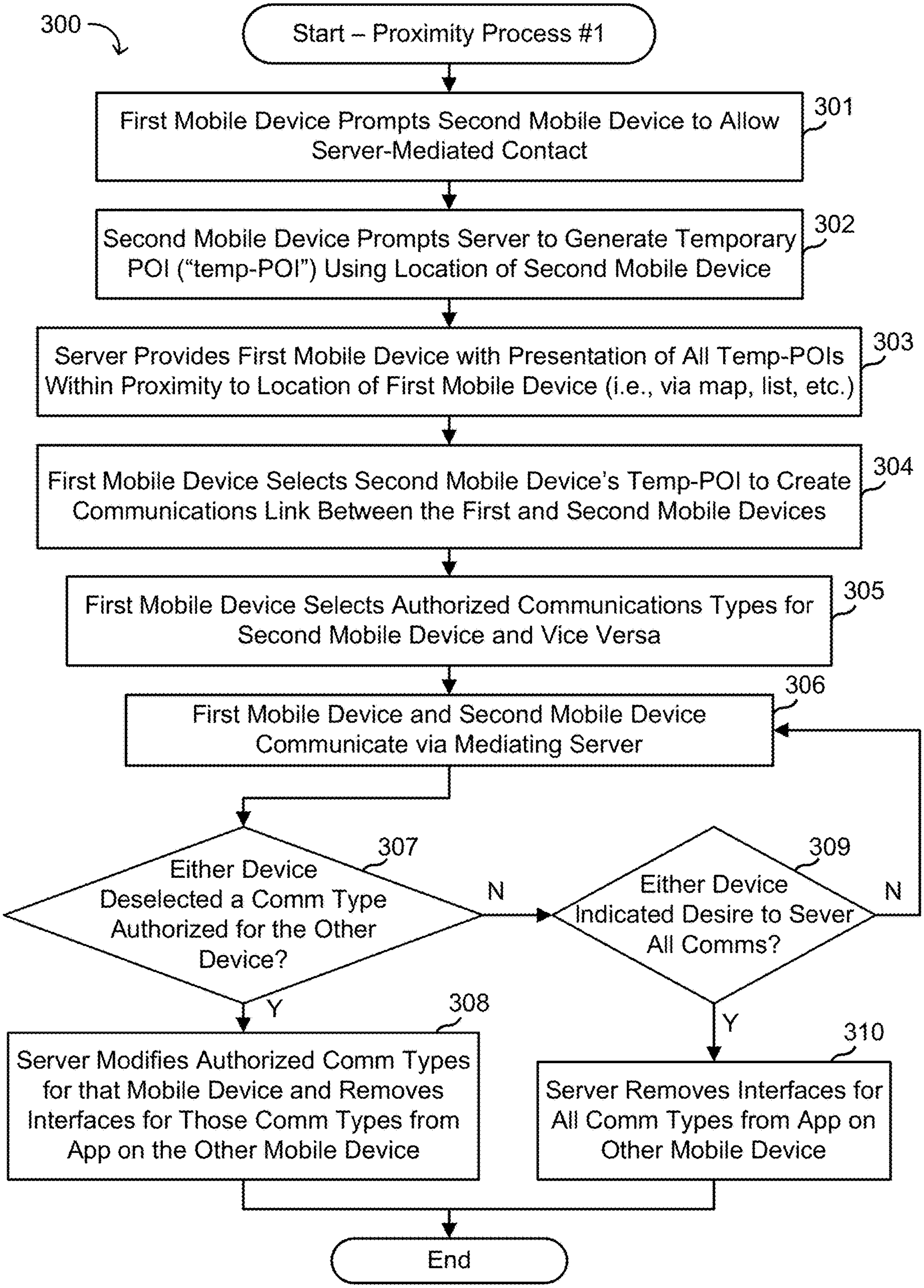
FIG. 3 is a flowchart illustrating initiating and maintaining contact between a first mobile device associated with a first user of the system and a second mobile device associated with a second user, wherein the first mobile device and the second mobile device are within physical proximity of each other.

FIG. 1 is an orthogonal drawing 100 illustrating a mobile device used in a gesturing action. A first mobile device at first position 101 might be pointed upwards with a first orientation or a first state of the first mobile device. The first mobile device may then be moved by the user of the system into a second position 102, with a second orientation, or a second state of the first mobile device. The first mobile device identifies a gesture that is represented in FIG. 3 by an arc 103 as a gesture that can be defined by, and/or based on, a first ray defined by first position 101 and the first orientation and a second ray defined by second position 102 and the second orientation. As illustrated, the first mobile device is shown in two positions, first position 101 at the start of a cast action and second position 102 at the end of the cast action.

In some embodiments, the first mobile device may detect a motion in a horizontal plane to trigger a cast. This first mobile device may detect the motion as the rate of change through the angle traversed, the actual angular change, or a combination of the two. The first mobile device may display the results of the search for the cast on a screen 104 of the first mobile device. The results might be a listing of other devices that are in proximity to the first mobile device or other devices that meet a particular criterion associated with a gesture. In addition to, or instead of, displaying results, the results might be provided to an application or other system operating the first mobile device. The system may determine that the motion does not meet a threshold (e.g., rate of change of angular motion) in the horizontal and/or vertical planes and the system may determine the motion is not a cast and thus ignore the motion. In an example, the threshold may be pre-defined or pre-set. In one or more implementations, the threshold is dynamically determined based on typical movement of the device. In general, a cast is a form of gesturing and mobile devices can be programmed to detect, and react to, other forms of gesturing. In some cases, the gesture that triggers or initiates an action on the first mobile device might include geographic indicia and thus be considered a "geogesture." An example of a geogesture might be that when a mobile device detects that the user made a "casting motion" such as illustrated in FIG. 1, that the user was in location A, that the rate of rotation of the mobile device was B, and the mobile device was in orientation C, the mobile device interprets that as a gesture selecting a geographic region and/or points of interest, devices, etc. present in that geographic region, where the geographic region so interpreted can be a function of A, B, and/or C.

In some embodiments, the first mobile device and the second mobile device via the system may be used for communication between Friends (chat, share content), Family (content share, communicate), Activity partners (meeting plans, content sharing), Romantic interests (dating, matrimonial), Teams (communications, information, events), for communication regarding Events (connections, solidarity), Common interest communication (chat, content sharing), Educational communication (classes, training), Commercial interaction (Estimates, Price Quotes, Contracts, Receipts, Warranty) via one or more communication channels that may be revocable by either entity in the communication.

In some embodiments, the first mobile device associated with the first entity may include options such as maintaining content relevant only to those specific personal network connections. For example, the first mobile device may allow relevant content based on maintaining a profile photo(s) specific to each personal channel of connection. In some embodiments, the first mobile device, via the system may show local information such as chat user's local time, local news, weather and the like to help start conversations, disseminate relevant content for example for a friend daily jokes, games and the like, shuffle the communication channels based on latest to top, chronologically save annotated media, offer open conference rooms with credentials, permanently or temporarily disconnect communication channels, archive and/or delete at an individual basis, searching, connecting and establishing a private network, and search based on context such as family, community groups, teams, events, business location, interest and the like.

In some embodiments, the first mobile device associated with the first entity may leave a trail of their presence and may connect with missed connections later in time, connect with a store/vendor/point of sale temporarily to get a receipt for a purchase, include the ability to maintain important calendar dates per channel, i.e., enabling user specific calendars for marking and reminding of appointments, birthdays, anniversaries, etc. to the two people in the channel, secure transfer of altcoins, cryptocurrency and other virtual currency and the like.

Figure 2:
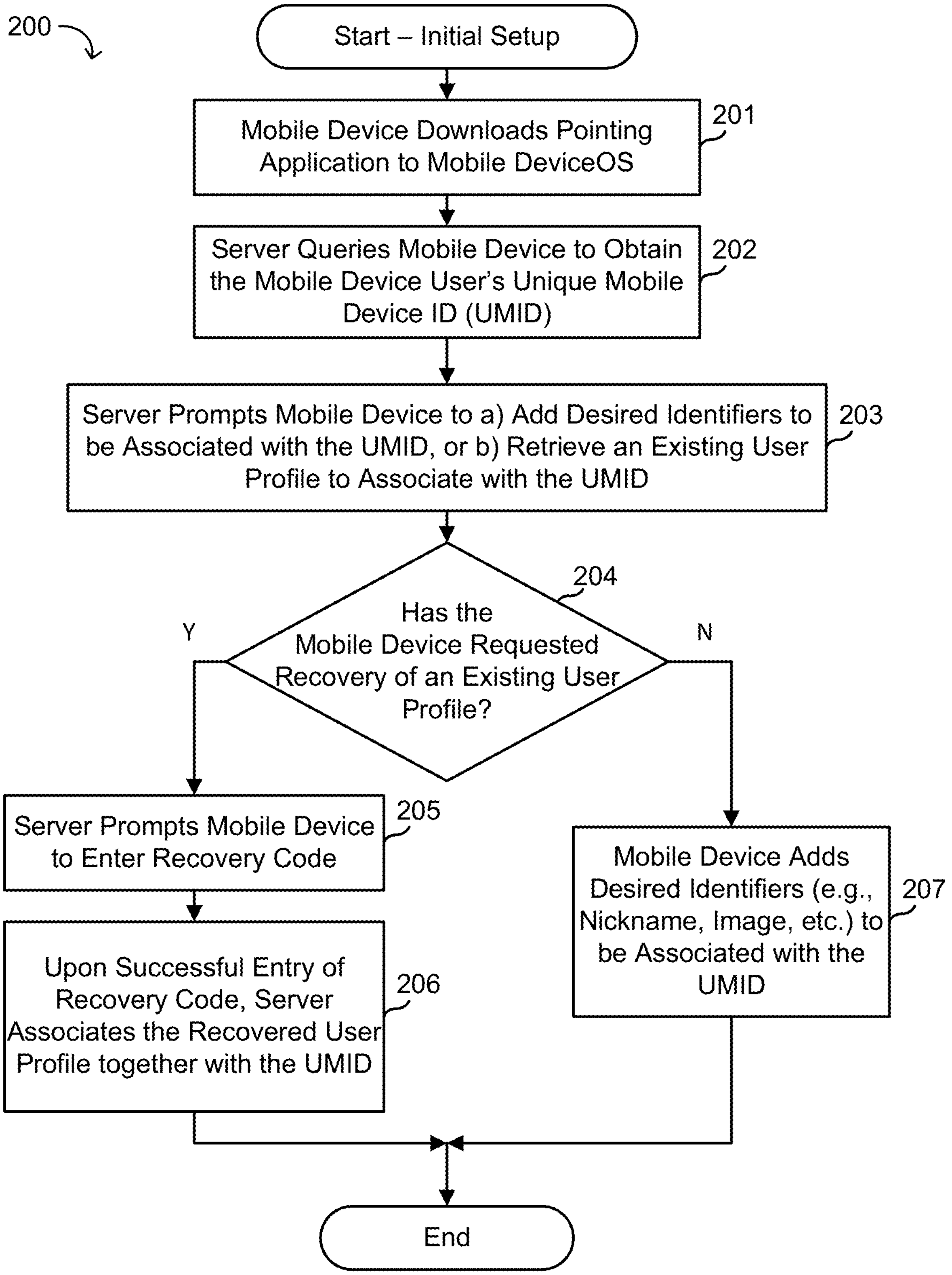
FIG. 2 is a flowchart illustrating a possible mode of operation that relates to initialization of a communication channel between a first mobile device and a second mobile device via an intermediated server.

FIG. 2 is a flowchart 200 that illustrates a possible mode of operation regarding initial setup of a mobile device. At step 201, a first mobile device associated with a first entity downloads the severable communications system application. The first entity may be a first user or a business, or a point of Interest or the like. The flowchart then branches to step 202. At step 202 the first mobile device may determine the unique mobile device ID ("UMID"). For example, the UMID may be specific to a unique mobile device or might be a software-generated passwordless device identifier, or an entity identifier (FID, GUID, UDID, IMEI, ICCID, FIDO, OpenID, or the like) or an identifier generated based on one or more parameters of associated with the mobile device, the parameters associated with the first entity, or both. Typically, the UMID, if visible to another mobile device, does not tie the UMID to an identity.

The first mobile device may transmit the UMID to the intermediated server such as the system. The flowchart then branches to step 203. At step 203, the severable communications system via the first mobile device may prompt the first entity to add desired identifiers to be associated with that UMID. In some embodiments, the severable communications system may prompt the first entity to recover an existing severable communications system profile to associate with that UMID. The flowchart then branches to step 204. At step 204, the system determines whether the first mobile device receive an indication as to whether to recover or migrate an existing severable communications system profile. For example, the system may determine that a new phone with a new UMID is added to the severable communications system, but the severable communications system may receive an indication that the first mobile device is associated with a pre-existing first entity that is already an entity registered with the severable communications system. In some embodiments, the severable communications system may determine based on an existing profile that may include a primary user identifier and a UMID and associated information (nicknames, pictures, call history, etc.) of first entity on the severable communications system that the first entity used when communicating via the severable communications system prior to migrating to a new mobile device. The system based on an indication received from the first mobile device requesting recovery of an existing severable communications system profile associated with a prior mobile device may branch to step 205.

At step 205, the first mobile device may prompt the user to enter the recovery code. The flowchart then branches to step 206. At step 206, the first mobile device on receiving the recovery code may transmit the code to the system. The system may associate the recovered severable communications system profile with the new UMID of the first mobile device. In some embodiments, the recovery code (generated by the first mobile device or the system or created by the first entity) may be a permanent code saved securely by the first entity. In some embodiments, the recovery code may have a time limitation (e.g., 10 minutes, 48 hours, etc.) to facilitate the migration of the user profile associated with the first entity after which the system may automatically delete the recovery code. In some embodiments, when the mobile device does not receive an indication from the first entity to recover an existing severable communications system profile the flowchart branches to step 207. At step 207, the severable communications system via the first mobile device prompts the first entity to add desired identifiers such as a nickname, avatar image, photo and the like to be associated with the UMID associated with the first entity. In some embodiments, the first mobile device may encrypt the desired identifiers based on the UMID. The system may not be able to access the encrypted identifiers because access control for decryption may be based on parameters associated with the first entity that restrict access to the decryption keys.

FIG. 3 is a flowchart 300 that illustrates a possible mode of operation regarding a first instance of users of the system within physical proximity of one another initiating and maintaining contact via the system. At step 301, the first mobile device prompts the second mobile device to allow contact via the severable communications system. It is assumed here that second mobile device is associated with second entity such as the second user that already has the severable communications system application installed on the second mobile device. In some embodiments, the second mobile device may prompt via a verbal request. The flowchart them branches to step 302. At step 302, the second mobile device associated with the second entity such as the second user prompts the severable communications system to generate a temporary POI using the location of second mobile device. The flowchart then branches to step 303. At step 303, the severable communications system displays all POIs within proximity to location of first mobile device (for example within 25 m) to first entity such as the first user.

In some embodiments, the first mobile device may display all POIs, by displaying the locations on a map, via a list, and the like. The flowchart then branches to step 304 in which first mobile device selects the POI of the second mobile device to create a communications link between the first mobile device and the second mobile device via the severable communications system.

At step 305, the first mobile device selects one or more authorized communication types for communicating with the second mobile device and vice versa. At step 305, the first mobile device selects the authorized communication types (VOIP voice calls, group chats, video calls, text communication, etc.) for use by the second mobile device associated with the second entity and vice-versa. In some embodiments, the first mobile device selects the authorized communication types (text, SMS, VOIP voice calls, group chats, video calls, etc.) for use by the first mobile device and vice-versa. The flowchart then branches to step 306.

At step 306, the first mobile device and the second mobile device may communicate via the severable communications system application. This communication may be via a severable communications system server, via peer-to-peer communication, by using the mobile devices of either the first mobile device, the second mobile device as a proxy server to form a local network and the like. The flowchart then branches to step 307 in which the severable communications system determines if either the first mobile device or the second mobile device has received input from the associated entity to deselect some but not all communication types authorized for use by the other. If the severable communications system determines that either mobile device has received an input from the entity associated with the mobile device to deselect some but not all communication types authorized for use by the other mobile device the flowchart branches to step 308. At step 308, the severable communications system modifies the communication types authorized for that user and removes the interfaces associated with those communication types for the severable communications system app on the other mobile device. The flowchart then branches back to step 306.

If the severable communications system determines that neither mobile device has received an input to deselect some but not all communication types authorized for use by the other mobile device, the flowchart branches to step 309. At step 309, the severable communications system determines if either mobile device has received an input indicating a request to sever all communications with the other. If the severable communications system determines that either mobile device has received and input to sever all communications with the other the flowchart branches to step 310. At step 310, the severable communications system removes the interfaces for all communication types from both the severable communications system apps on the first and the second mobile device. It should be noted that the user identifier associated with the first entity may still be retained in the severable communications system application on the first mobile device and communications may be reinitiated at a later date, and similarly regarding the second mobile device associated with the second entity, thus enabling the breaking of and then re-initiating of communications without the need to re-authorize the initial contact between the two mobile devices associated with the first and the second entity of the severable communications system with the ability for the user to unblock the other user later from the first mobile device. If the severable communications system determines that neither mobile device has received an input to sever all communications with the other the flowchart branches back to step 306.

Figure 4:
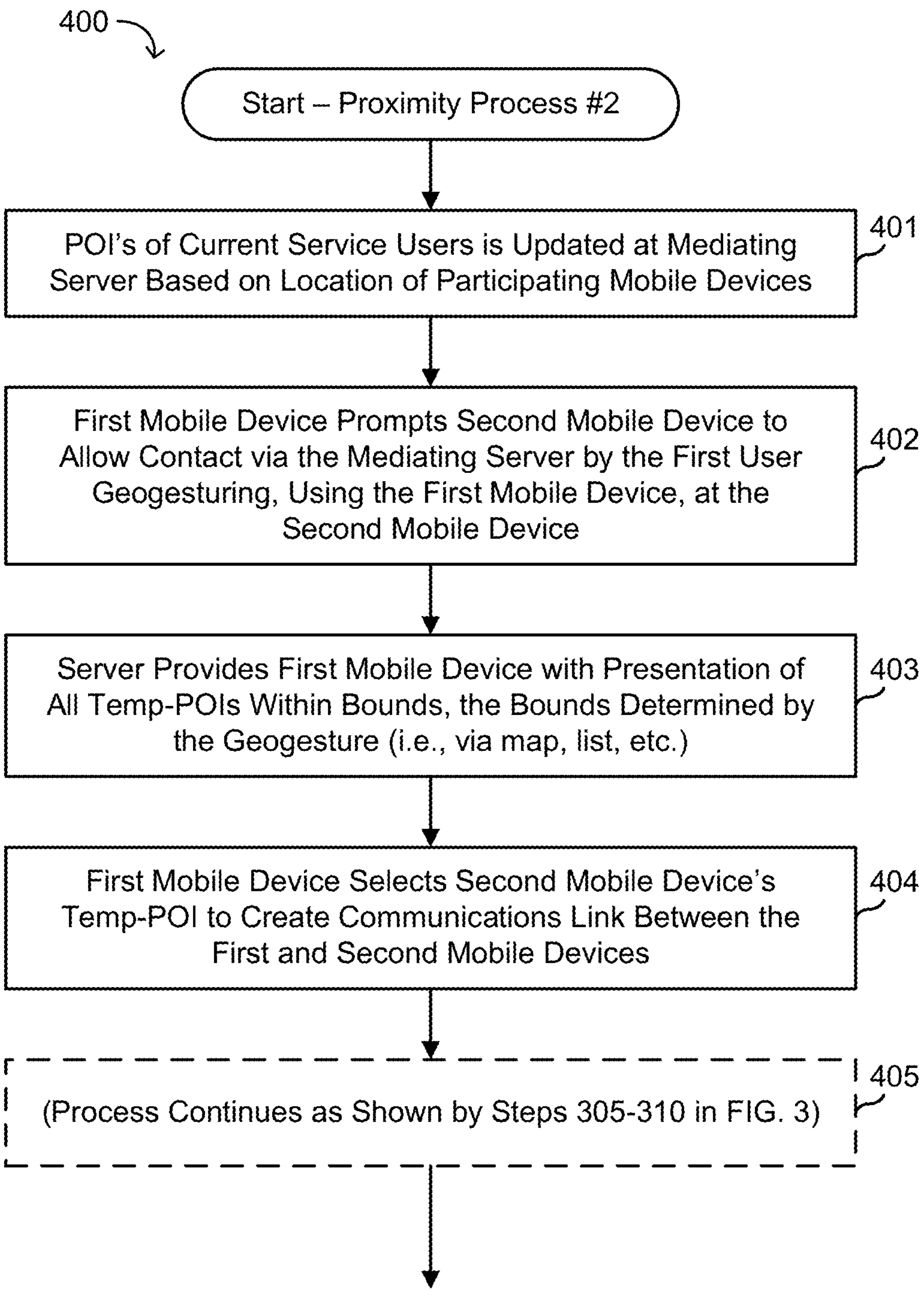
FIG. 4 is a flowchart illustrating initiating and maintaining contact between a first mobile device associated with a first user of the system and a second mobile device associated with a second user, wherein the first mobile device and the second mobile device are within physical proximity of each other.

FIG. 4 is a flowchart 400 that illustrates a possible mode of operation regarding a second instance of users of the system within physical proximity of one another initiating and maintaining contact via the system. At step 401, POI's relating to all current severable communications system mobile devices associated with entities such as users are constantly updated at the severable communications system server level based upon the location of the severable communications system mobile devices. The flowchart then branches to step 402. At step 402, the first mobile device prompts the second mobile device to allow contact via the severable communications system via a geogesture received at the first mobile device associated with the first entity. A geogesture might be interpreted by the first mobile device as an instruction to search for other users who have devices in proximity to the first mobile device, wherein positioning/proximity might be determined based on their GPS, NFC, UWB, Bluetooth, etc. determinations and a user gesture of phone movement or push of a button on a phone screen to trigger a search.

The second mobile device associated with the second entity might already have the severable communications system application installed on the second mobile device. The flowchart them branches to step 403. At step 403, the severable communications system displays all severable communications system POIs within the geolocated area defined by the geogesture of the first mobile device. This may be accomplished by showing the locations on a map, via a list, and the like. The flowchart then branches to step 404, in which the first mobile device receives an input from the first entity that selects the POI of the second mobile device associated with the second entity to create a communications link between the first mobile device and the second mobile device via the severable communications system. The flowchart then branches to step 405, wherein the process continues as illustrated in FIG. 3 for steps 305-310.

Figure 5:
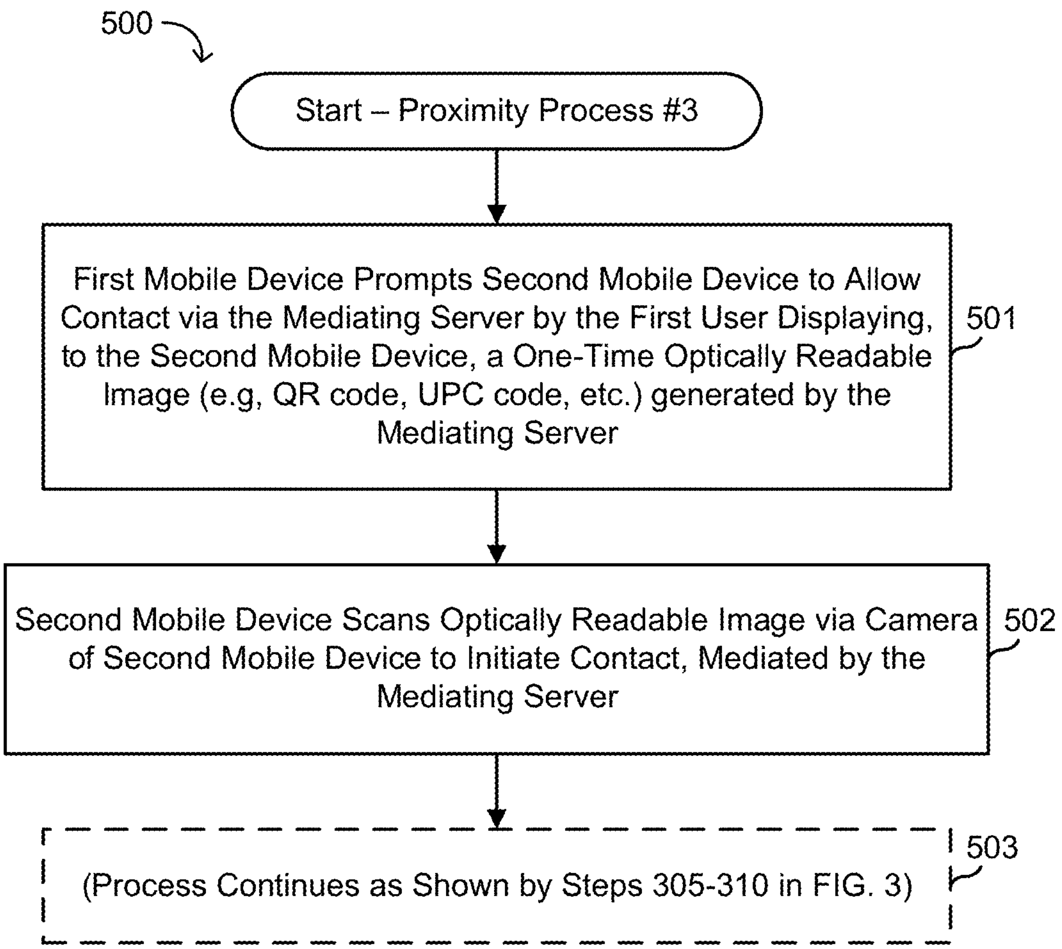
FIG. 5 is a flowchart illustrating initiating and maintaining contact between a first mobile device associated with a first user of the system and a second mobile device associated with a second user, wherein the first mobile device and the second mobile device are within physical proximity of each other.

FIG. 5 is a flowchart 500 that illustrates a possible mode of operation regarding a third instance of users of the system within physical proximity of one another initiating and maintaining contact via the system. At step 501, a first mobile device prompts a second mobile device to allow contact via a severable communications system by displaying, on the screen of the second mobile device, to the second entity, a one-time optically readable image or graphic such as a QR Code, UPC, plain alphanumeric text string and the like generated by the severable communications system. The flowchart then branches to step 502. At step 502, the second entity scans the optically readable image via a camera of the second mobile device to initiate contact with the first mobile device via the severable communications system.

The QR code or other codes generated may embed connection information of the first mobile device associated with the first entity using URL parameters to automatically install the application on the mobile device if it was not already installed and then display the search results of those entities that are in proximity to the first mobile device. The flowchart then branches to step 503, wherein the process continues as illustrated in FIG. 3 for steps 305-310.

In the examples herein, methods and apparatus for initiating a connection between two mobile devices while allowing operators or owners of either of those devices to be able to end a connection thereby terminating an ability for the user of the other device to contact the severing user. The two mobile devices can address each other using codes or handles provided by a severable communications system, where the codes or handles are such that they cannot be used, or are very difficult to use, by one user to contact another user after the second user has indicated to the severable communications system that the code or handle should no longer be used to communicate with the mobile device of the other user. In some implementations, there can be more than two user devices using a particular communications channel.

As part of an initial connection, a first user device can connect through the severable communications system to a second user device by the first user device providing the code or handle associated with the second user device and the severable communications system determining that the code or handle applies to a particular type of channel (e.g., phone, text, social media, e-mail) and that the second user device has not indicated that the code or handle is to no longer be used.

The initial connection might be between two devices that have installed a severable communications system app and are connected based on possibly arbitrary unique identifiers that are independent of identifiers each user might use on a permanent basis for other communications. The initial connection might instead be between two devices where one of the devices is not already associated with the severable communications system.

In such a case, a first user device might be known to the severable communications system based on an account established by or for the first user of the first user device and the first user device might be currently logged in to the first user's account at the severable communications system, while a second user device might not be known to the severable communications system. In a particular interaction, the first user device might convey some information, via wireless communication to the second user device and/or via optical presentation on a display of the first user device that can be read by a camera of the second user device. That information might be used by the second user to establish a connection to the first user via the severable communications system. Where the second user does not have an account with the severable communications system, the second user device might make a request to its operating system for a unique device identifier, such as a UMID, that the second user device can provide to the severable communications system to uniquely identify the second user device. If the second user decides to set up an account with the severable communications system, then a login ID of the second user could be used instead to identify the second user to the severable communications system. The unique device identifier might be specific to the app that the second user device used to obtain the information and connection from the first user device.

In some embodiments, the code, handle, and/or operating system supplied unique ID might have a time to live (TTL) after which it is not considered valid or actionable. In a particular example, the device ID that is used to identify the second user device can be considered expired once the second user downloads an app from a web server or an app server associated with the severable communications system and the second user establishes a unique identifier associated with their account with the severable communications system. For communications after that, the first user device and the second user device can both reference the other device using the handle provided by the severable communications system. This approach can allow for some benefits of using the severable communications system to accrue to device users before they set up their own accounts, or even if they never do set up an account with the severable communications system.

Figure 6:
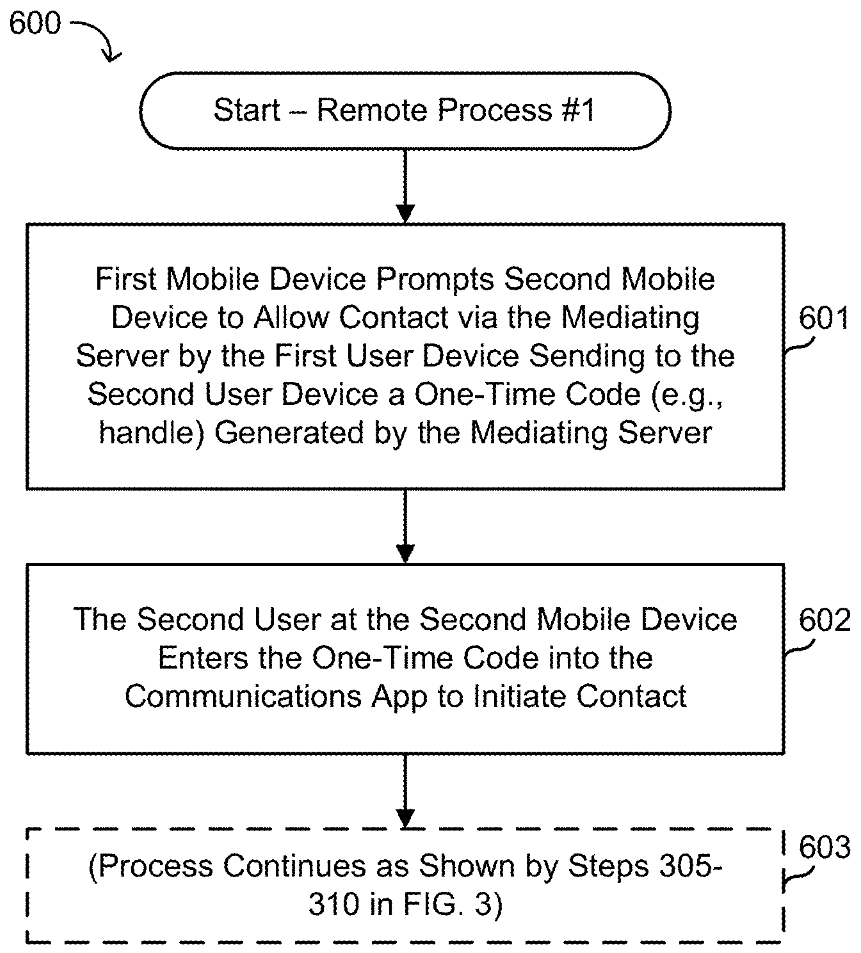
FIG. 6 is a flowchart illustrating initiating and maintaining contact between a first mobile device associated with a first user of the system and a second mobile device associated with a second user, wherein the first mobile device and the second mobile device are remote from the other mobile device.

FIG. 6 is a flowchart 600 that illustrates a possible mode of operation regarding users of the system at locations remote from one another initiating and maintaining contact via the system. At step 601, the first mobile device prompts the second mobile device to allow contact via the severable communications system by sending to the second mobile device, via an existing communication channel other than the severable communications system (e.g., text, SMS, VOIP voice calls, group chats, video calls, etc.), a one-time code or "handle" generated by the severable communications system. The flowchart then branches to step 602, in which the second mobile device receives the one-time code into the severable communications system application running on the second mobile device to initiate contact with the first mobile device via the severable communications system. The flowchart then branches to step 603, wherein the process continues as illustrated in FIG. 3 for steps 305-310.

Figure 7:
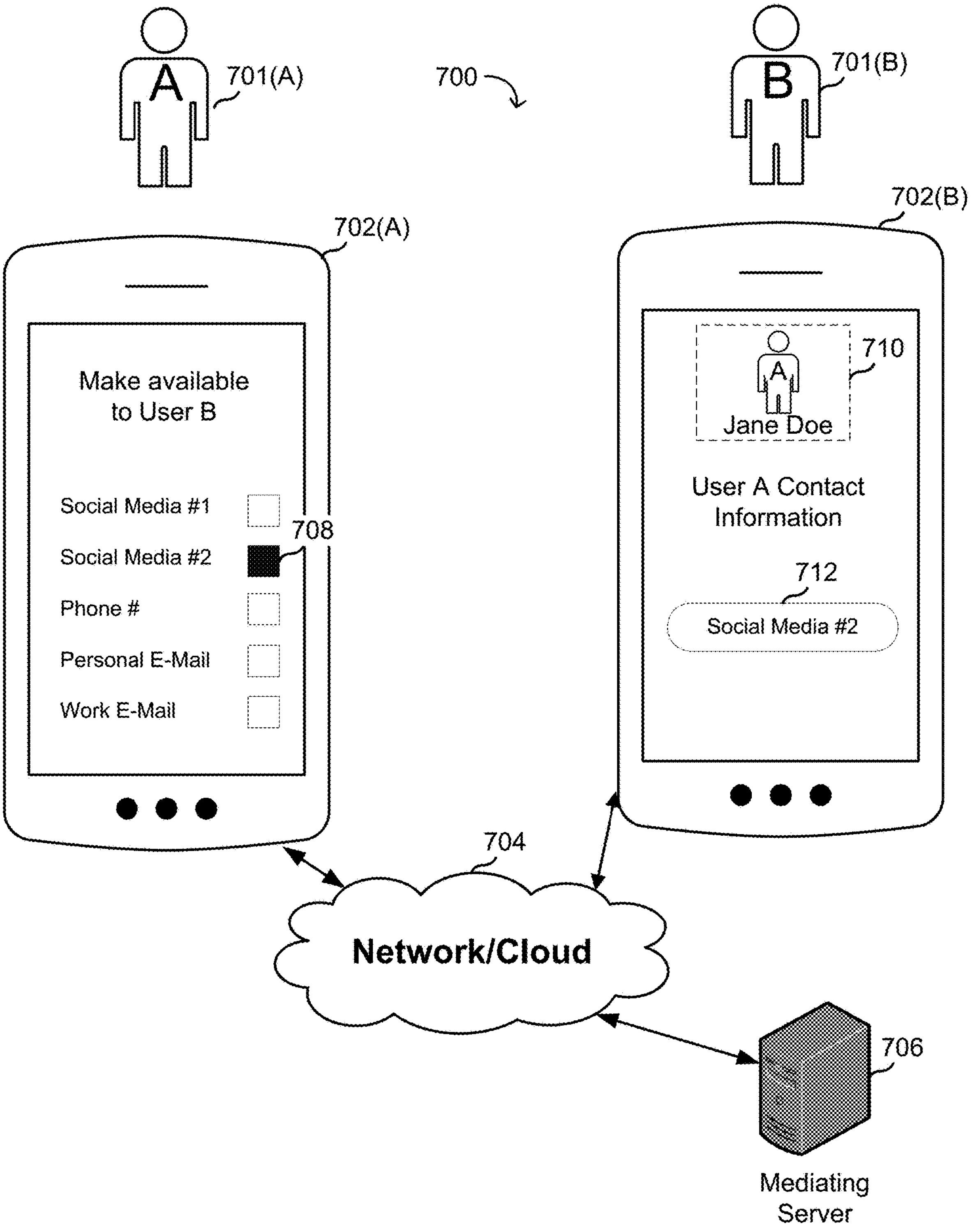
FIG. 7 is a simplified functional block diagram of an embodiment of a configuration wherein two users with user devices can connect, with the use of a mediating server, to communicate over severable communication channels with user control of communication channels.

FIG. 7 is a simplified functional block diagram of an embodiment of a configuration 700 wherein two users with user devices can connect, with the use of a mediating server, to communicate over severable communication channels with user control of communication channels. As shown in FIG. 7, a first user 701(A) might wish to establish a severable communication channel with a second user 701(B) using their respective devices such as smart phone 702(A) and smart phone 702(B). It should be understood that other devices besides smart phones could be used if they have the needed communications capability.

In the example shown, smart phone 702(A) and smart phone 702(B) connect to network/cloud 704, which in turn provides connectivity to a mediating server 706. In operation of mediating server 706, it can provide a connection channel between devices in a way that should any participant in a communication desire to terminate a particular severable communications channel, that device can do so by informing mediating server 706. Since separately identifying handles (e.g., phone numbers, social media names, chat handles, e-mail addresses, etc.) is not required, communication channels can be terminated when mediating server 706 does not provide the mediation.

In a specific example illustrated in FIG. 7, user 701(A) indicates, by selecting box 708, that user 702(B) can communicate with user 701(A) via a platform labeled "Social Media #2." That request appears on smart phone 702(B) as a request 710 from user 701(A) and user 701(B) can press a button 712 to accept the request from user 701(A). The particular identities of user 701(A) and 701(B) need not be disclosed and allows for severing of the communication by sending a severance request to mediating server 706.

Figure 8:
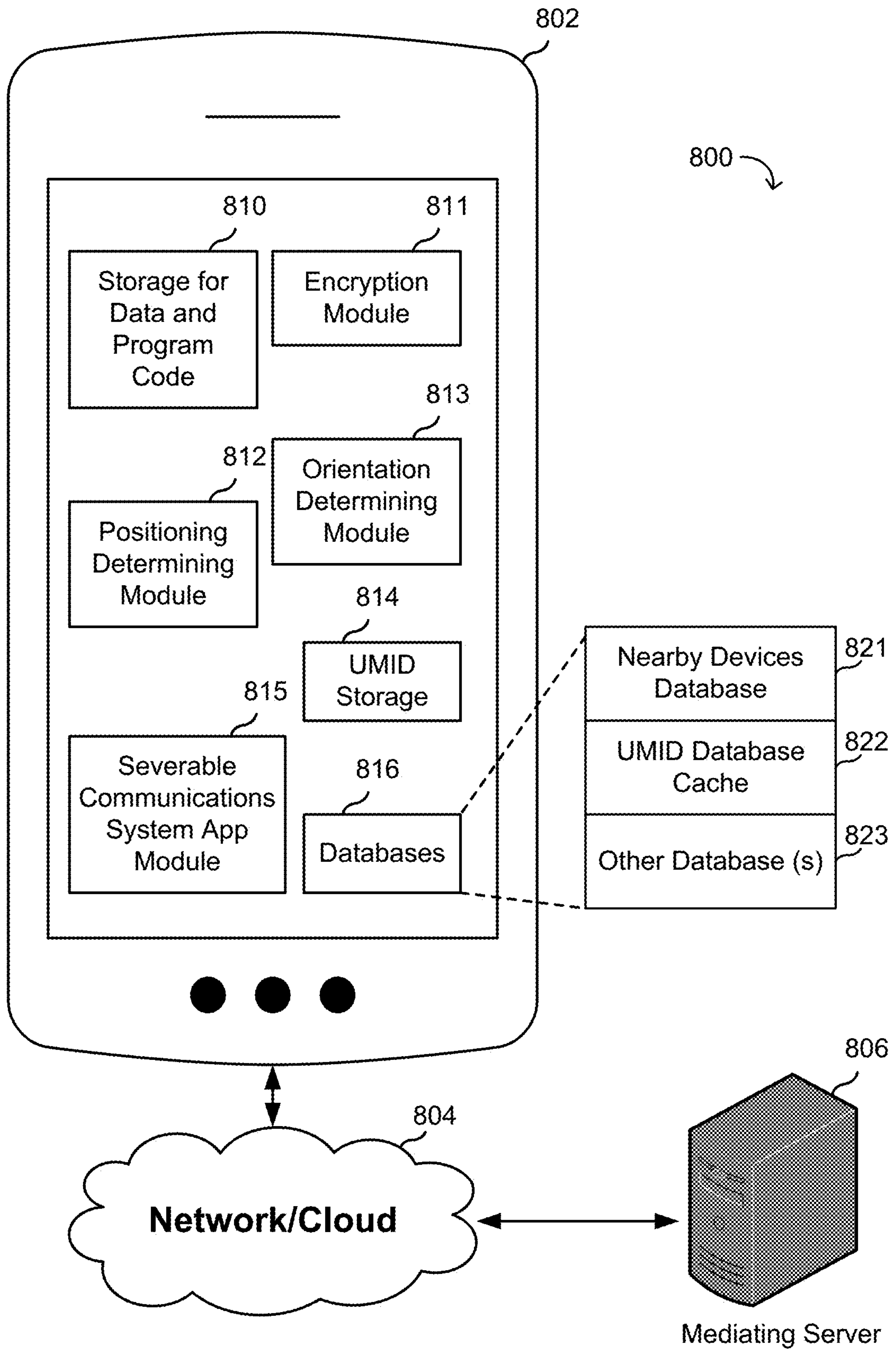
FIG. 8 is a simplified functional block diagram of an embodiment of a user device.

FIG. 8 is a simplified functional block diagram 800 of an embodiment of a user device, such as a smart phone 802 operable for user control of communication channels, communicating over a network or cloud 804 with various servers such as a mediating server 806. As shown, smart phone 802 might include storage for data and program code 810, an encryption module 811, a position determining module 812 usable for determining a geographic location of smart phone 802, an orientation determining module 813 usable for determining an orientation of smart phone 802, such as a compass direction, a UMID storage 814 for storing a UMID of smart phone 802 in computer-readable form, and a severable communications system module 815. Severable communications system module 815 might be an app downloaded from an app/program store or an app repository and might not be present on every smart phone involved in an interaction of two users.

Smart phone 802 might also include a variety of databases 816, such as a nearby devices database 821, a UMID database cache 822, and possibly other databases 823. One or more databases might contain additional information related to devices that are physically proximate to smart phone 802, which can be determined by signals emitted by one or more smart phone or, in the case where multiple smart phones are supporting a severable communications system module that is in communications with a mediating server, by having devices report their location to the mediating server and proximity information being distributed to devices determined to be in proximity.

UMID database cache 822 might store UMIDs of nearby devices. By identifying a nearby device by a UMID, one user who is running a severable communications system module—which might be part of, or used together with, a pointing application—can connect with another user who is not necessarily running a severable communications system module and the UMID is generated some other way. This allows for a second user to be invited to connect to a mediating server for controlled interaction with the first user.

Data from position determining module 812 and the orientation determining module 813 can be used to generate a gesture. The determined gesture can be used to establish an intermediated communication channel with access control between smart phone 802 and other devices using various methods as described herein. Additional information may be accessed by severable communications system app module 815 and appended to initiate and maintain communication channels on smart phone 802. Information such as a UMID that may then be transmitted via cloud 804 to mediating server 806 at which the information defining the UMID is stored and made available to various applications. For example, mediating server 806 may use the UMID from smart phone 802 to identify a communication channel associated with smart phone 802 and another smart phone, to allow communication between smart phone 802 and the other smart phone.

Figure 9:
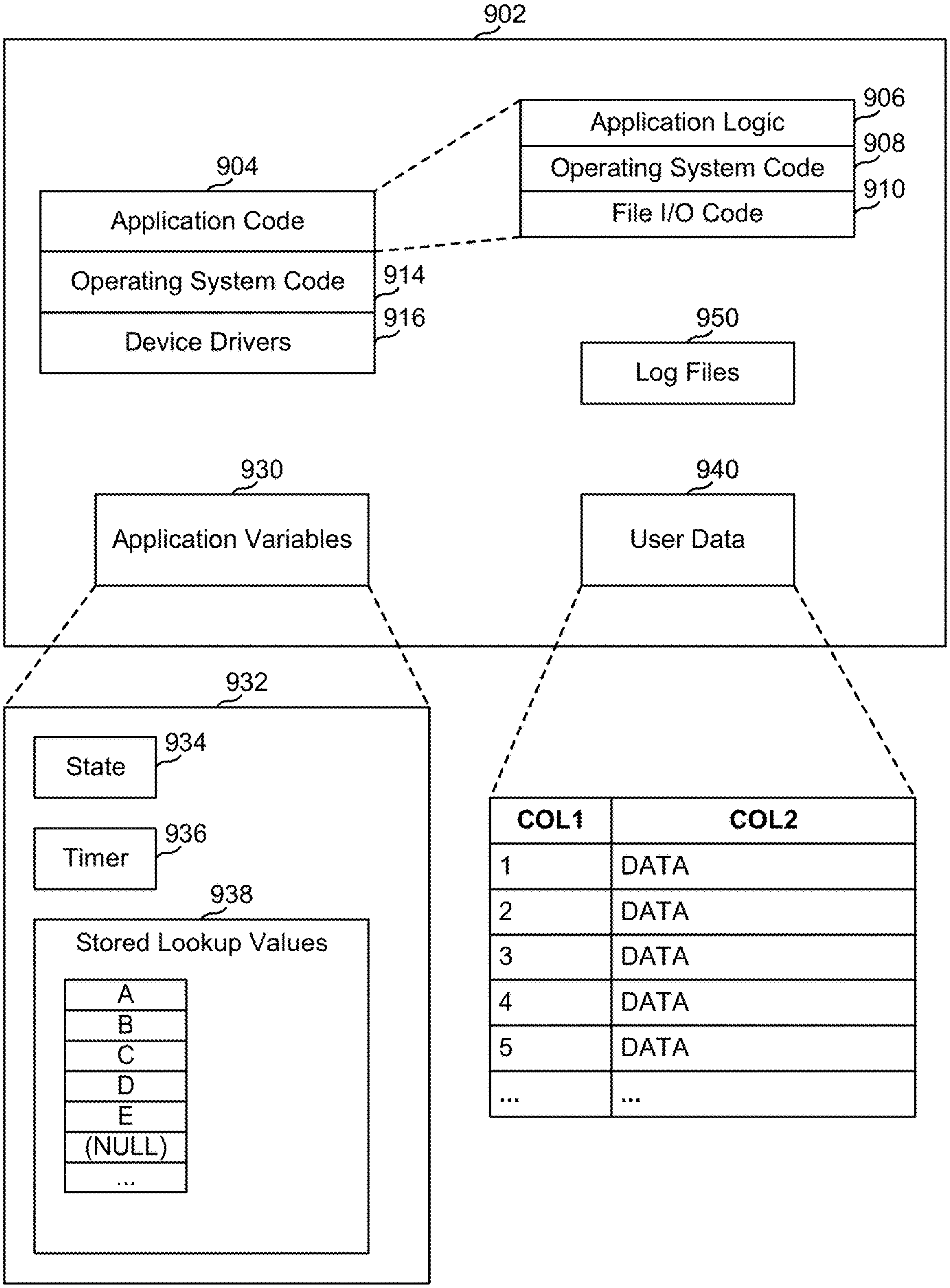
FIG. 9 illustrates an example computer system memory structure as might be used in performing methods described herein, according to various embodiments.

FIG. 9 is a simplified functional block diagram of a storage device 902 storing an application that can be accessed and executed by a processor in a computer system as might be part of embodiments described herein. FIG. 9 also illustrates an example of memory elements that might be used by a processor to implement elements of the embodiments described herein. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network. For example, where a functional block is referenced, it might be implemented as program code stored in memory. The application can be one or more of the applications described herein, running on servers, clients or other platforms or devices and might represent memory of one of the clients and/or servers illustrated elsewhere.

Storage device 902 can be one or more memory device that can be accessed by a processor and storage device 902 can have stored thereon application code 904 that can be one or more processor readable instructions, in the form of write-only memory and/or writable memory. Application code 904 can include application logic 906, library functions 908, and file I/O functions code 910 associated with the application. The memory elements of FIG. 9 might be used for a server or computer that interfaces with a user, generates data, and/or manages other aspects of a process described herein. In addition to application code 904, storage device 902 might also contain operating system code 914 and device drivers 916.

Storage device 902 can also include storage for application variables 930 that can include one or more storage locations configured to receive variables 932. Application variables 930 can include variables that are generated by the application or otherwise local to the application, such as state variables 934, timers 936, and/or stored lookup values 938. Application variables 930 can be generated, for example, from data retrieved from an external source, such as a user or an external device or application. A processor can execute application code 904 to generate application variables 930 provided to storage device 902. Application variables 930 might include operational details needed to perform the functions described herein.

Storage device 902 can include storage for databases and other data described herein. One or more memory locations can be configured to store user data 940, which might include data sourced by an external source, such as a user or an external device. User data 940 can include, for example, records being passed between servers prior to being transmitted or after being received. Other data might also be supplied.

Storage device 902 can also include log files 950 having one or more storage locations configured to store results of the application or inputs provided to the application. For example, log files 950 can be configured to store a history of actions, alerts, error messages, and the like.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Figure 10:
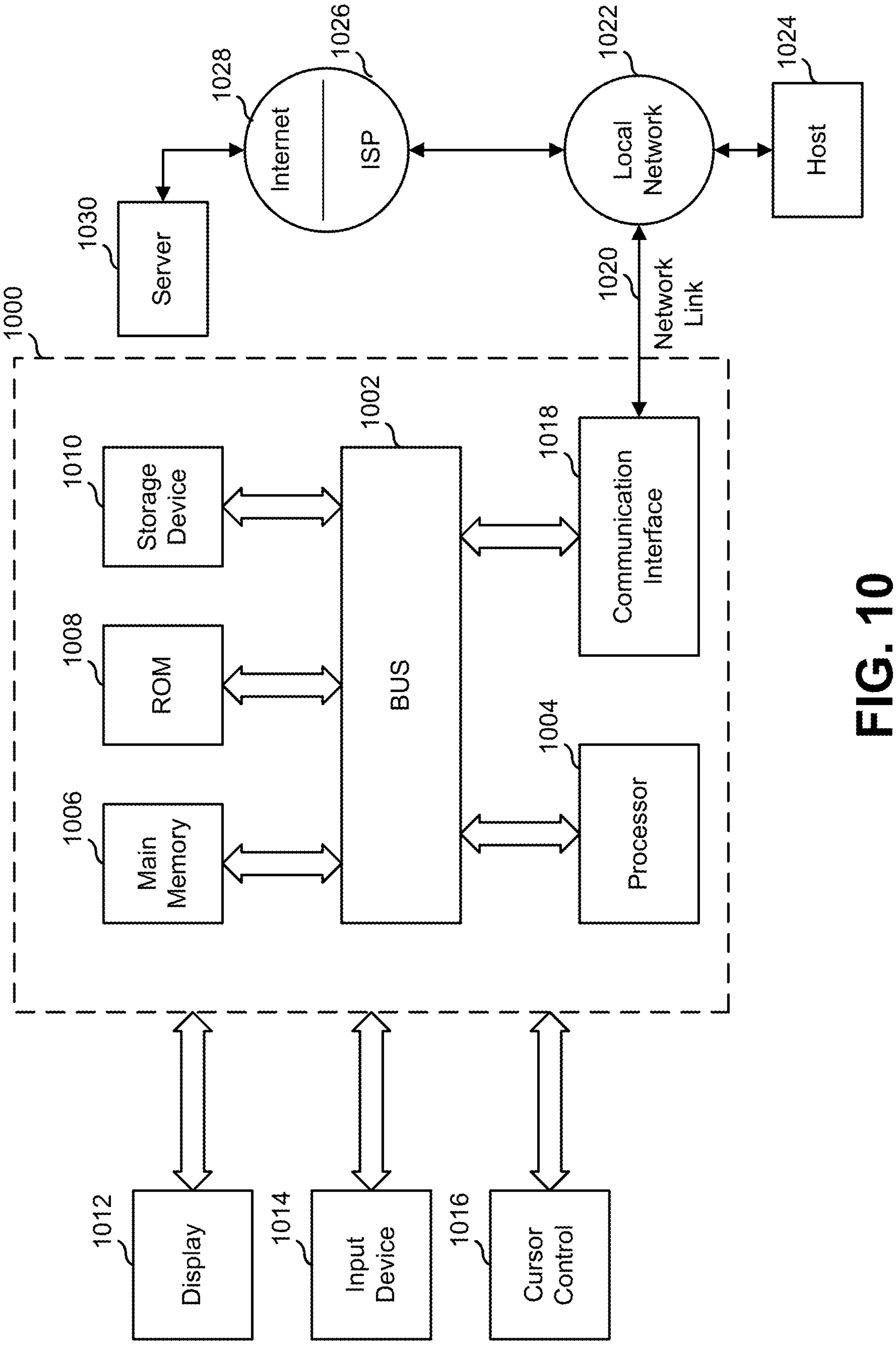
FIG. 10 is a block diagram illustrating an example computer system upon which the systems illustrated herein may be implemented, according to various embodiments.

FIG. 10 is a block diagram that illustrates a computer system 1000 upon which the computer systems of the systems described herein and/or data structures shown in FIG. 9 may be implemented. Computer system 1000 includes a bus 1002 or other communication mechanism for communicating information, and a processor 1004 coupled with bus 1002 for processing information. Processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 may also be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a computer monitor, for displaying information to a computer user. An input device 1014, including alphanumeric and other keys, is coupled to bus 1002 for communicating information and command selections to processor 1004. Another type of user input device is a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network connection. A modem or network interface local to computer system 1000 can receive the data. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be a network card, a modem, a cable modem, or a satellite modem to provide a data communication connection to a corresponding type of telephone line or communications line. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020, and communication interface 1018. In the Internet example, a server 1030 might transmit a requested code for an application program through the Internet 1028, ISP 1026, local network 1022, and communication interface 1018. The received code may be executed by processor 1004 as it is received, and/or stored in storage device 1010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method for facilitating communications between two or more devices via a severable communications system, wherein the severable communications system provides for communications between devices using a device identifier that can be removed after communications, comprising:

initiating, via a first user interface of a first device, a two-way communication between the first device and a second device, wherein the two-way communication is initiated by a first user of the first device, using a physical gesture of the first device directed to a second user of the second device;

determining a first identifier, stored by the severable communications system, associated with the first device, wherein the first identifier is determined based on a device-specific identifier supplied by a device operating system of the first device;

determining a second identifier, stored by the severable communications system, associated with the second device, wherein the second identifier is determined based on a device-specific identifier supplied by a device operating system of the second device;

verifying, via the severable communications system, that the severable communications system has not received a previous request from either the first device or the second device to sever communications between the first identifier and the second identifier; and establishing, via the severable communications system, a communication channel based on the first identifier and the second identifier.

2. The method of claim 1 further comprising:

receiving, via the first user interface of the first device, a request to sever the communication channel; and removing the first identifier from the severable communications system, thereby removing access to the communication channel from the second device.

3. The method of claim 1, wherein the severable communications system is one or more of a remote server, a peer-to-peer network, and/or a system with distributed data records.

4. The method of claim 1, further comprising:

initiating the two-way communication at the first device using the physical gesture of the first device;

determining a geographic location for the two-way communication based on a location of the first device;

providing the severable communications system and/or the second device with a desired two-way communication request, wherein the desired two-way communication request comprises an indication of the physical gesture; and searching, at the severable communications system, for a membership record associated with the first user.

5. The method of claim 4, further comprising:

determining an orientation of the physical gesture of the first device; and deriving a gesture area based on the orientation.

6. The method of claim 5, wherein the physical gesture comprises a movement of the first device in a forward arcing movement, wherein the forward arcing movement defines the orientation and an initial size of the gesture area.

7. The method of claim 6, wherein the gesture area is used to determine which other devices to consider as the second device based on which devices are determined to be within the gesture area.

8. The method of claim 4, wherein a physical gesture is represented in a data structure by one or more of a single point, a latitude and longitude, a geographic coordinate system, a polygon, a polyhedron, and/or another 3D shape.

9. The method of claim 1, wherein the second identifier is provided to the severable communications system by the first user device, based on a direct interaction between the first user device and the second user device.

10. The method of claim 1, wherein the second user identifier is provided by the second user device to the severable communications system.

11. The method of claim 1, wherein the first user device may provide authorized communication types for communications with a second device, based on the second identifier.

12. The method of claim 1, wherein the two-way communication is initiated by a first user of the first device displaying an optical code in a format that is readable by the second user device for use in connecting with the severable communications system.

13. The method of claim 12, wherein the optical code is a QR code that encodes (1) a URL pointing to the severable communications system, and (2) a temporary identifier of the first user device.

14. The method of claim 1, further comprising:

receiving, via the first user interface of the first device, a request to sever the communication channel; and retaining the first identifier in the severable communications system, thereby allowing reinitiation of communication.

15. A non-transitory computer-readable media for interacting between users of mobile devices via a severable communications system, the non-transitory computer-readable media storing program instructions for causing a computer to perform:

initiating, via a first user interface of a first device, a two-way communication between the first device and a second device, wherein the two-way communication is initiated by a first user of the first device, using a physical gesture of the first device directed to a second user of the second device;

determining a first identifier, stored by the severable communications system, associated with the first device, wherein the first identifier is determined based on a device-specific identifier supplied by a device operating system of the first device;

determining a second identifier, stored by the severable communications system, associated with the second device, wherein the second identifier is determined based on a device-specific identifier supplied by a device operating system of the second device;

verifying, via the severable communications system, that the severable communications system has not received a previous request from either the first device or the second device to sever communications between the first identifier and the second identifier; and establishing, via the severable communications system, a communication channel based on the first identifier and the second identifier.

16. The non-transitory computer-readable media of claim 15, wherein the program instructions further cause the computer to perform:

initiating the two-way communication at the first device using a physical gesture of the first device;

determining a geographic location for the two-way communication based on a location of the first device;

providing the severable communications system and/or the second device with a desired two-way communication request, wherein the desired two-way communication request comprises an indication of the physical gesture; and searching, at the severable communications system, for a membership record associated with the first user.

17. The non-transitory computer-readable media of claim 16, wherein the program instructions further cause the computer to perform:

determining an orientation of the gesture or of the first device; and deriving a gesture area based on the orientation.

18. The non-transitory computer-readable media of claim 17, wherein the gesture comprises a movement of the first device in a forward arcing movement, wherein the forward arcing movement defines the orientation and an initial size of the gesture area.

19. The non-transitory computer-readable media of claim 15, wherein the severable communications system is one or more of a remote server, a peer-to-peer network, and/or a system with distributed data records.

* * * * *